United States Patent Office 2,885,419
Patented May 5, 1959

2,885,419

AMINO ALKYL SILICATES

Sidney Beinfest and Phillip Adams, Berkeley Heights, and Howard Milius, Cranford, N.J., assignors to Berkeley Chemical Corporation, Berkeley Heights, N.J., a corporation of New Jersey No Drawing. Application September 25, 1956
Serial No. 612,058

1 Claim. (Cl. 260—448.8)

This invention relates to novel chemicals, amino alkyl silicates, which can be utilized among other things as stone preservatives, weather proofing and water proofing agents.

The novel amino alkyl silicates of this invention can be represented by the following formula:

$$(R'O)_xSi[O(R'')N(R''')_2]_y$$

wherein $y$ is an integer from 1 to 4, $x$ is an integer from 0 to 3, the sum of $x$ and $y$ equalling 4, R' is a radical selected from the group consisting of alkyl, alicyclic and aryl radicals, R'' is an alkylene group, and R''' is a radical selected from the group consisting of hydrogen, alkyl, alicyclic and aryl radicals, at least one R''' radical being a radical other than hydrogen when $y$ is 4. The R' and R''' can thus be the same or different and also connote substituted derivatives including heterocyclic derivatives.

Typical examples of these compounds are:

2-aminoethyl tricetyl silicate
Di-2-aminoethyl di-stearyl silicate
Tri-2-amino propyl tridecyl silicate
2-amino trimethylene diethyl silicate
Di-2-amino butyl di-cetyl silicate
N-lauryl imino bis-2,2' diethyl dihexyl silicate
Di-tertiary-butyl di-2-amino ethyl silicate
Di-2-diethyl amino ethyl di-stearyl silicate
Tri-2-diethyl amino ethyl cetyl silicate
2-methyl amino ethyl tri-tridecyl silicate
N-phenyl imino bis-2,2' ethyl diethyl silicate
2-diethyl amino propyl tricetyl silicate
Tetra-2-diethyl amino ethyl silicate The amino alkyl silicates where $y$ is 4 can be prepared by the reaction of a tetraalkyl silicate, preferably tetraethyl with an alkanolamine whose boiling point is higher than the corresponding alcohol derived from the alkyl group in the tetraalkyl silicate so as to control the equilibrium. This is shown in equation I.

$$(C_2H_5O)_4Si + 4(C_2H_5)_2NCH_2CH_2OH \rightarrow$$
$$[(C_2H_5)_2NCH_2CH_2O]_4Si + 4C_2H_5OH\uparrow$$

EQUATION I

This reaction proceeds readily by mixing at moderate temperatures, e.g., 110° C. and does not require a catalyst. Subatmospheric pressures can be used along with higher temperatures to remove the last traces of alcohol.

The compounds containing one or more R'O substituents can be prepared by the reaction of an amino silicate with an alcohol whose boiling point is higher than the amino alcohol evolved from the amino silicate as shown in Equation II.

$$[(C_2H_5)_2NC_2H_4O]_4Si + XC_{18}H_{37}OH \rightarrow$$
$$[(C_2H_5)_2NC_2H_4O]_{4-x}Si(OC_{18}H_{37})_x$$
$$+ X(C_2H_5)_2NC_2H_4OH\uparrow$$

EQUATION II

This reaction also proceeds non-catalytically at moderate temperatures, e.g., about 160° C. and higher and vacuum is applied as the temperature is raised near the completion of the reaction.

A generalized alternative method of preparing the compounds of this invention is shown in equation III.

$$XR'OH + YR''{}_2NR''OH + (C_2H_5O)_4Si \rightarrow$$
$$(R'O)_xSi(OR''NR'''{}_2)_y + 4C_2H_5OH\uparrow$$

EQUATION III

This invention will be better understood by reference to the following examples of the preparation of the indicated compounds and their testing for the indicated purposes.

Example 1.—Tetra diethyl amino ethyl silicate 522 g. 2(NN' diethyl) amino ethanol (4.4 moles) and 208 g. ethyl silicate were mixed and heated. The reaction began at 110° C. and after 5 hours 95% of the ethanol had distilled off. The pressure was lowered and the ethanol plus excess alcohol distilled off. The yield was 437 g., 90% of a liquid with a boiling point 225–230/5 mm. and a specific gravity$_{25}$ 0.922.

Example 2.—Tetra dimethyl amino ethyl silicate

This was prepared in the same manner as Example 1 except that the dimethyl derivative was used. A 65% yield of a liquid having a boiling point of 168–173° C. 6 mm. was obtained.

Example 3.—Di(βdiethyl amino ethyl) di-cetyl silicate

Tetra (βdiethyl amino ethyl) silicate 250 g. (0.5 m.), 248 g. of cetyl alcohol (Adol 52) (1.0 m.) were mixed together and heated to 200° C. at which point reaction began. The diethyl amino ethanol was removed at a temperature of 162° C.; when the still temperature reached 260° C., the pressure was reduced and the alcohol removed. The reaction was completed at a pressure of 15 mm. and a still temperature of 270° C. The yield was 375 g.

Example 4.—Di cetyl di-2-amino ethyl silicate

Cetyl alcohol (Adol 52) 242 g. (1.0 m.) was mixed with 136 g. (0.5 m.) of tetra-2-amino ethyl silicate. The pressure was reduced to 100 mm. and the 2-amino ethyl alcohol was removed at a temperature of 115° C. When the still temperature reached 225° C. the pressure was gradually lowered to 10 mm. at which point the reaction was completed. 1 m. of 2-amino ethanol was recovered.

Example 5.—Mono cetyl tri (βdiethyl amino ethyl) silicate 0.5 m. of tetra (βdiethyl amino ethyl) silicate 246 g. and 121 g. of cetyl alcohol 0.5 m. (Adol 52) were mixed and heated to 215° C. at which point the reaction began. After 1 hour the reaction was completed after the pressure was lowered to 20 mm. The yield was 309 g.

Example 6.—Di (βamino ethyl) di-tridecyl silicate 10 moles (2010 g.) of tridecyl alcohol, 10 moles of ethanolamine (610 g.) and 5.0 moles of ethyl silicate (1040 g.) were heated. At 110° C. ethyl alcohol began distilling off. At 200° C. and 3 hours later ¾ of the alcohol was removed. The pressure was lowered to 40 mm. to remove the remaining alcohol. The yield was 2610 g. Specific gravity$_{25}$ 0.912.

Example 7

One compound of this invention, tetra diethyl amino ethyl silicate, was compared with tetra amino ethyl silicate as far as efficacy. The compound of this invention was stable and fairly soluble in water and because of only slow hydrolysis could be applied readily to various surfaces. The other material, however, hydrolyzed immediately in water making it unsuitable for use.

*Example 8*

Di (2-diethylaminoethyl) di-cetyl silicate was applied to asbestos shingles and rendered them impervious to water.

The novel chemicals of this invention vary in physical state from liquids to waxy solids. When added to small amounts of water, they polymerize and gel. In large amounts of water with very strong agitation uniform dispersions or solutions are obtained with many of these compounds. Because of this and their structure, great flexibility in adapting them for specific uses is possible.

The novel chemicals of this invention can also be utilized as intermediates in the preparation of other synthetic organic chemicals as shown for example in the following equation.

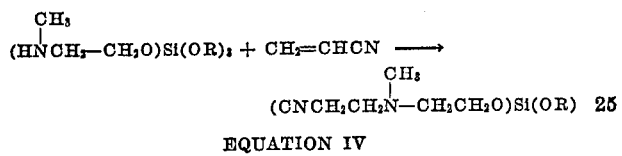

EQUATION IV

Similarly phenyl triethoxy silane, di-amyl diethoxy silane, and similar silanes can be used as a source of the silicon moiety. In these cases the general formula can be represented as

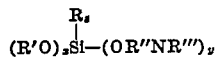

where $R_z$ is any group linked directly from carbon to silicon, R', R'', and R''' have been described previously, and $x+y+z=4$ and $y$ is an integer from 1 to 3.

Polysilicic esters can also be used as a source of the silicon. In these cases the product will be a complex polysiloxane. This is shown by the following equation $(C_2H_5O)_3SiOSi(OC_2H_5)_3 + 6H_2NCH_2CH_2OH \rightarrow$ $(H_2NCH_2CH_2O)_6Si_2O + 6EtOH$

EQUATION V

The advantages of this invention will be apparent to the skilled in the art. New compounds of great utility and flexibility are provided. They can be used among other things in preservative coatings, for treating glass fibers and hydrophobic modifying agents for mineral type fillers. In addition they have great utility in synthesis as well as in curing and catalyzing epoxy resin systems.

It is understood that this invention is not limited to the specific examples which have been offered merely as illustrations and that modifications may be made without departing from the spirit of the invention.

What is claimed is:

As a new chemical, tetra diethyl amino ethyl silicate.

References Cited in the file of this patent

UNITED STATES PATENTS

| | | |
|---|---|---|
| 2,541,154 | Clapsadle | Feb. 13, 1951 |
| 2,566,365 | Pedlow et al. | Sept. 4, 1951 |

FOREIGN PATENTS

| | | |
|---|---|---|
| 637,532 | Germany | Oct. 30, 1936 |

OTHER REFERENCES

Post: "The Chemistry of the Aliphatic Orthoesters," Reinhold Publishing Corp., New York, publishers (1943), p. 148.

Di Giorgio et al.: "Jour. Amer. Chem. Soc.," vol. 71 (1949), pp. 3254–56.

Larsson: "Acta Chem. Scand.," vol. 8 (1954), pp. 898–900 (49, Chem. Abstracts 10, 836).